United States Patent
Konishi et al.

(10) Patent No.: US 11,104,428 B2
(45) Date of Patent: Aug. 31, 2021

(54) UNMANNED AERIAL VEHICLE

(71) Applicant: Panasonic Intellectual Property Corporation of America, Torrance, CA (US)

(72) Inventors: Kazunobu Konishi, Osaka (JP); Stephen William John, Nara (JP); Katsuhiko Asai, Nara (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 430 days.

(21) Appl. No.: 16/147,941

(22) Filed: Oct. 1, 2018

(65) Prior Publication Data

US 2019/0106205 A1 Apr. 11, 2019

Related U.S. Application Data

(60) Provisional application No. 62/569,168, filed on Oct. 6, 2017.

(30) Foreign Application Priority Data

May 30, 2018 (JP) .............................. JP2018-103850

(51) Int. Cl.
*B64C 27/00* (2006.01)
*B64C 39/02* (2006.01)
*G10K 11/178* (2006.01)

(52) U.S. Cl.
CPC .......... *B64C 27/001* (2013.01); *B64C 39/024* (2013.01); *G10K 11/17823* (2018.01); *G10K 11/17873* (2018.01); *B64C 2201/108* (2013.01); *B64C 2220/00* (2013.01); *G10K 2210/1281* (2013.01); *G10K 2210/3044* (2013.01); *G10K 2210/3226* (2013.01)

(58) Field of Classification Search
None
See application file for complete search history.

(56) References Cited

U.S. PATENT DOCUMENTS

| 2015/0353192 | A1* | 12/2015 | Morrison | B64C 27/32 |
| | | | | 244/17.23 |
| 2016/0379619 | A1 | 12/2016 | Sugaya | |
| 2018/0033421 | A1* | 2/2018 | Yamagishi | H04R 1/028 |
| 2018/0204585 | A1* | 7/2018 | Whittaker | B64C 39/024 |

FOREIGN PATENT DOCUMENTS

JP    2017-009965    1/2017

* cited by examiner

*Primary Examiner* — Kenny H Truong
(74) *Attorney, Agent, or Firm* — Greenblum & Bernstein, P.L.C.

(57) ABSTRACT

An unmanned aerial vehicle capable of employing active noise cancelling without being influenced by wind from a rotor is provided. The unmanned aerial vehicle includes a processor and at least one speaker. The processor acquires operational information regarding each of at least one generator and generates an opposite phase signal having an opposite phase relative to a signal corresponding to the operational information. The at least one generator generates a force to fly the unmanned aerial vehicle. The operational information correlates with noise generated by each of the at least one generator. The at least one speaker outputs sound based on the opposite phase signal.

8 Claims, 3 Drawing Sheets

UNMANNED AERIAL VEHICLE

BACKGROUND

1. Technical Field

The present disclosure relates to an unmanned aerial vehicle.

2. Description of the Related Art

An unmanned aerial vehicle is described in Japanese Unexamined Patent Application Publication No. 2017-9965 with reference to a wireless aircraft capable of reducing noise while maintaining the flight performance of the main body of the device. More specifically, the wireless aircraft described in Japanese Unexamined Patent Application Publication No. 2017-9965 flies in the air by rotors (propellers) rotated by a motor. At this time, the wireless aircraft described in Japanese Unexamined Patent Application Publication No. 2017-9965 picks up the rotational noise of the motor, generates a sound wave with opposite phase relative to the collected rotational noise of the motor, collects surrounding sounds, and combines the picked-up surrounding sounds and the sound wave with opposite phase relative to the collected rotating noise of the motor. That is, the wireless aircraft performs so-called active noise cancelling (ANC).

SUMMARY

However, when a microphone is disposed near the rotor, the airflow generated by the rotor may hit the microphone and, thus, wind noise may enter the microphone. Consequently, it is not easy to properly pick up the noise generated by the rotor (a reference signal), and it is difficult to apply ANC to the unmanned aerial vehicle without being influenced by the wind from the rotor.

One non-limiting and exemplary embodiment provides an unmanned aerial vehicle capable of applying ANC without being influenced by the wind from a rotor.

In one general aspect, the techniques disclosed here feature an unmanned aerial vehicle including a processor and at least one speaker. The processor acquires operational information regarding each of at least one generator and generates an opposite phase signal having an opposite phase relative to a signal corresponding to the operational information, where the at least one generator generates a force to fly the unmanned aerial vehicle and the operational information correlates with noise generated by each of the at least one generator. The at least one speaker outputs sound based on the opposite phase signal.

According to an unmanned aerial vehicle of an aspect of the present disclosure, the ANC can be applied without being influenced by wind from the rotor.

It should be noted that general or specific embodiments may be implemented as a system, an apparatus, a method, an integrated circuit, a computer program, a non-transitory computer-readable storage medium, such as a compact disc-read only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

In recent years, unmanned aerial vehicles (UAVs), also known as drones, have been beginning to be used to, for example, collect information. For example, by moving an unmanned aerial vehicle having a sensor mounted thereon to a difficult place for humans to get to, various kinds of information about the place can be obtained from the sensor. For example, such an unmanned aerial vehicle is used to pick up sounds around the unmanned aerial vehicle.

In general, the noise generated by the unmanned aerial vehicle (mainly the noise generated by the rotation of the rotor) is large. Therefore, it is desirable that the noise be reduced and, thereafter, the sound around the unmanned aerial vehicle be picked up. To reduce the noise, the active noise canceling (ANC) technique can be employed, for example. By using the ANC technique, the noise (a reference signal) generated by the unmanned aerial vehicle is picked up and, thereafter, the noise can be reduced.

ANC is a technique for actively controlling noise (e.g., unwanted sound) by using opposite phase sound. In addition, a technique for removing only sound related to noise from target sound has been developed. For example, noise (a reference signal) is picked up, and the noise is reduced by emitting, from a loudspeaker, the opposite phase sound to the noise. The opposite phase sound relative to the noise (the reference signal) is a sound with an opposite phase relative to the noise and is a sound with a waveform generated by inverting the waveform of the noise. In this manner, the sound picked up as noise is reduced.

In order to apply the ANC, a microphone that picks up noise may be disposed near the source of noise and, more specifically, near the rotor of an unmanned aerial vehicle, for example. The rotor is a main source of noise generation.

However, the wind generated by the rotor may hit the microphone and, thus, wind noise may enter the microphone. That is, noise that differs from the noise to be removed by noise cancelling may enter the microphone and, thus, the noise generated by the rotor may not be appropriately picked up. If the noise is not picked up correctly, the noise may not be appropriately reduced from the sound around the unmanned aerial vehicle. As described above, it is not easy to appropriately pick up the noise generated by the rotor and, thus, it is difficult to apply ANC to the unmanned aerial vehicle without being influenced by the wind from the rotor.

According to an aspect of the present disclosure, an unmanned aerial vehicle includes a processor and at least one speaker. The processor acquires operational information regarding each of at least one generator and generates an opposite phase signal having an opposite phase relative to a signal corresponding to the operational information, where the at least one generator generates a force to fly the unmanned aerial vehicle and the operational information correlates with noise generated by each of the at least one generator, The at least one speaker outputs sound based on the opposite phase signal.

According to the aspect, the actually generated noise is not used as the reference signal used for noise canceling. Instead, the operational information about the generator (e.g., the rotor and the motor that rotates the rotor) is used, and the operational information correlates with the noise. The operational information includes but not limited to the rotational speed, the value of a current input to the motor, the load torque of the motor or the value of the current actually flowing in the motor, and a control command. That is, since a microphone that picks up the actually generated noise is not used at the time of ANC, ANC is not influenced by wind noise generated by the wind that is produced by the rotation of the rotor and that hits the microphone. As a result, ANC can be applied without being influenced by the wind from the rotor.

In addition, each of the at least one generator may include a rotor. The noise generated by each of the at least one generator may include noise generated by rotation of the rotor, and the operational information may have a correlation with a rotational speed of the rotor.

According to the configuration, the operational information correlated with the noise generated by each of the at least one generator has a correlation with the rotational speed of the rotor. Consequently, the rotational speed of the rotor and the noise pattern of the noise can be modeled in advance. Therefore, it is possible to generate, from the model, an opposite phase signal with opposite phase relative to a reference signal (the noise pattern) corresponding to the rotational speed of the rotor. Thereafter, the noise generated by the rotation of the rotor can be reduced by the ANC using the rotational speed of the rotor as the reference signal. In addition, the major noise generated by the unmanned aerial vehicle can be effectively reduced without being influenced by the wind.

In addition, the unmanned aerial vehicle may further include a sensor that acquires the rotational speed of the rotor of each of the at least one generator, and the operational information may include the rotational speed of the rotor.

According to the configuration, ANC according to the actual rotational speed of the rotor can be performed by using the acquisition device (for example, a laser measuring instrument) and acquiring the rotational speed of the rotor. Thus, more effective noise reduction can be performed. In addition, an opposite phase signal of a signal (a noise pattern) corresponding to the operational information including the rotational speed can be easily generated.

In addition, each of the at least one generator may include a motor that rotates the rotor. The unmanned aerial vehicle may further include a sensor that acquires a current value input to the motor and rotational information about the motor. The operational information may include the current value and the rotational information.

For example, the rotational speed of the rotor can be calculated by using the value of a current input to the motor that rotates the rotor and the rotational information about the motor (for example, the load torque of the motor or the value of the current actually flowing in the motor). Consequently, the rotational speed of the rotor can be calculated by using the acquisition device (for example, an ammeter or a load torque measuring instrument) and acquiring the value of a current input to the motor and the rotational information about the motor. As a result, an opposite phase signal of a signal (a noise pattern) corresponding to the operational information including the value of a current input to the motor and the rotational information about the motor (that is, the operational information including the calculated rotational speed of the rotor) can be easily generated with a simple configuration, such as an ammeter, without using a laser measuring instrument or the like.

In addition, each of the at least one generator may include a rotor and a motor that rotates the rotor. The noise generated by each of the at least one generator may include noise generated by rotation of the motor that rotates the rotor. The unmanned aerial vehicle may further include a sensor that acquires the rotational speed of the motor of each of the at least one generator, and the operational information may include information that is correlated with the rotational speed of the motor of each of the at least one generator.

According to the configuration, the operational information including the information correlated with the noise generated by the each of the at least one generator is correlated with the rotational speed of the motor. Consequently, the rotational speed of the motor and the noise pattern of the noise can be modeled in advance. Therefore, it is possible to generate, from the model, an opposite phase signal of a reference signal (the noise pattern) corresponding to the rotational speed of the motor, and the noise generated in accordance with the rotational speed of the motor can be reduced by the ANC using the rotational speed of the motor as the reference signal. For example, by acquiring the rotational speed of the motor by using the acquisition device (for example, a motor rotational speed measuring instrument), the opposite phase signal of a signal (the noise pattern) corresponding to the rotational speed can be easily generated.

The unmanned aerial vehicle may further include an interface that acquires a control command sent to the unmanned aerial vehicle, and the processor may control the flight of the unmanned aerial vehicle on a basis of the control command, calculate the rotational speed of the rotor on the basis of the control command, and generate the opposite phase signal on the basis of the control command.

For example, the unmanned aerial vehicle is controlled (piloted) by a control command sent from a remote controller, such as a proportional system. The control command includes a command to control the rotation of the rotor and the rotation of the motor so that the unmanned aerial vehicle goes up or down, right or left, forward or backward, or makes a turn. In addition, the control command includes information about the path to be followed or the speed information. Consequently, a future variation of the rotational speed of the rotor or the motor can be predicted from the control command. Consequently, for example, by acquiring a control command by using the control command acquisition device (for example, a wireless communication interface), the rotational speed of the rotor or the motor can be calculated and, thus, the opposite phase signal of a signal (a noise pattern) corresponding to the rotational speed can be easily generated. In this manner, before the noise is generated, an opposite phase signal for reducing the noise can be generated in advance. As a result, the noise can be reduced without taking into account the processing delay.

In addition, the at least one generator may include two or more generators. The at least one speaker may include only one speaker. The processor may generate one opposite phase signal having an opposite phase relative to a signal corresponding to the operational information about the two or more generators, and the one speaker may output the sound based on the one opposite phase signal.

According to the configuration, even when the unmanned aerial vehicle includes two or more generators, one opposite phase signal is generated from the operational information about the two or more generators. Thus, the one speaker can reduce the noise generated by the two or more generators.

It should be noted that general or specific embodiments may be implemented as a system, an apparatus, a method, an integrated circuit, a computer program, a non-transitory computer-readable storage medium, such as a CD-ROM, or any selective combination thereof.

Exemplary embodiments are described in detail below with reference to the accompanying drawings. Note that each of the embodiments described below is a general or specific example of the present disclosure. A value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

In addition, it will be recognized that all of the figures are schematic representations for purposes of illustration and do not necessarily depict the locations of the constituent elements illustrated and the actual relative sizes.

Exemplary Embodiments

Exemplary embodiments are described below with reference to FIGS. 1 and 2.

Figure 1:
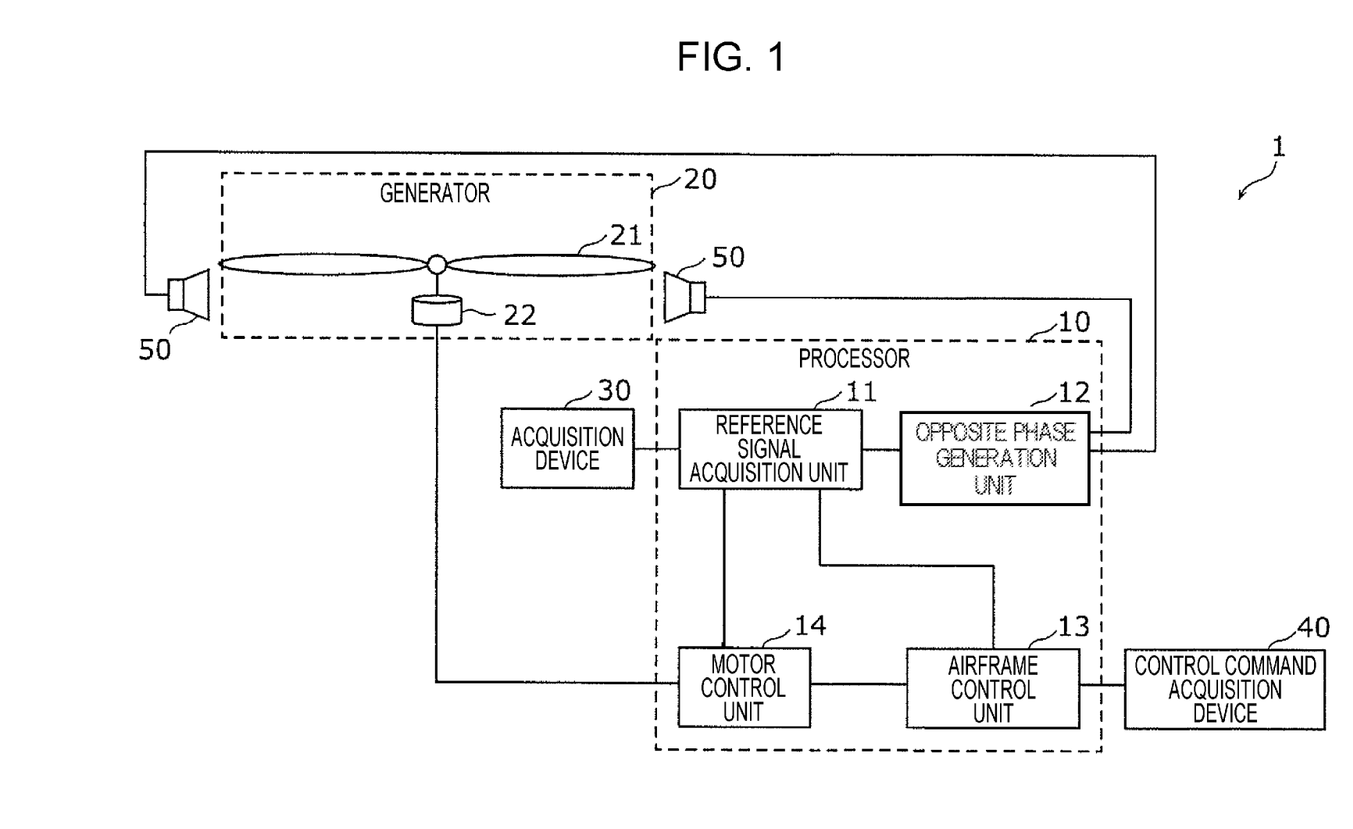
FIG. 1 is a schematic illustration of the configuration of an unmanned aerial vehicle according to an exemplary embodiment.
Figure 2:
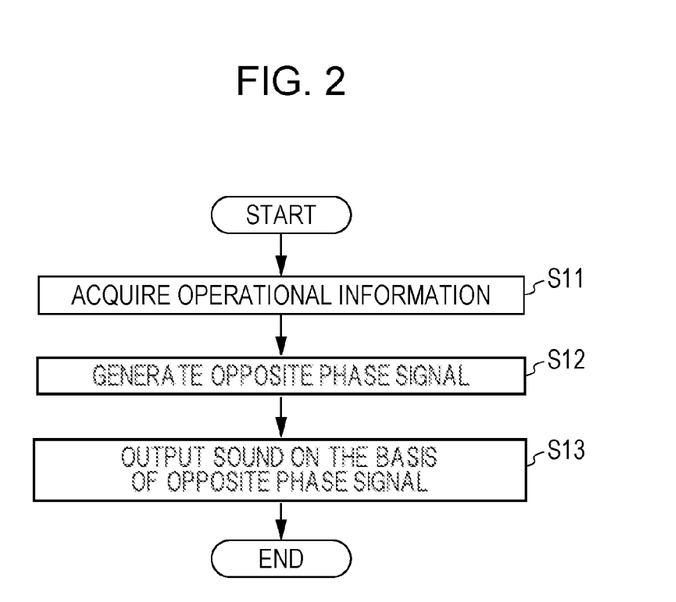
FIG. 2 is a flowchart illustrating an example of the operation performed by the unmanned aerial vehicle according to the exemplary embodiment.

FIG. 1 is a schematic illustration of the configuration of an unmanned aerial vehicle 1 according to an exemplary embodiment. FIG. 2 is a flowchart illustrating an example of the operation performed by the unmanned aerial vehicle 1 according to the exemplary embodiment.

The unmanned aerial vehicle 1 includes a processor 10, at least one generator 20, an acquisition device 30, a control command acquisition device 40, and at least one loudspeaker 50 (also referred to herein as "speaker"). In FIG. 1, one generator 20 is illustrated as at least one generator 20, and two speakers 50 are illustrated as at least one loudspeaker 50.

The generator 20 generates a force to fly the unmanned aerial vehicle 1. For example, the generator 20 is a machine including a power source, an actuator for generating a flying force by using the power transmitted from the power source, and other structures. For example, the generator 20 includes a rotor 21 and a motor 22 to rotate the rotor 21. The force for causing the unmanned aerial vehicle 1 to fly is, for example, a lift force that moves or raises the unmanned aerial vehicle 1 in the vertical direction or a thrust force that moves the unmanned aerial vehicle 1 in the horizontal direction, that is, a thrust force that moves the unmanned aerial vehicle 1 back and forth and to the right and left. Since the generator 20 generates noise when rotating the rotor 21 to generate a force to fly the unmanned aerial vehicle 1, the generator 20 is a source of noise. For example, the noise generated by the generator 20 includes noise generated by the rotation of the rotor 21 (wind noise) and the noise generated by the rotation of the motor 22 (motor sound).

The processor 10 is an electric circuit that performs information processing for controlling the unmanned aerial vehicle 1. The processor 10 may be, for example, a microprocessor. The unmanned aerial vehicle 1 includes a memory (not illustrated), such as a read only memory (ROM) and a random access memory (RAM), which stores a control program and the like executed by the processor 10. The processor 10 includes, as functional constituent elements, a reference signal acquisition unit 11, an opposite phase generation unit 12, an airframe control unit 13, and a motor control unit 14. These functional constituent elements of the processor 10 are achieved by the control program that is executed.

The processor 10 (the reference signal acquisition unit 11) acquires operational information about each of the at least one generator 20 (step S11). The operational information has a correlation with noise generated by the at least one generator 20. According to a widely used ANC technique, the actually generated noise is picked up by a microphone, and the picked-up noise is used as the reference signal for ANC. However, in this case, instead of using the actually generated noise, the operational information correlated with the noise is used as a reference signal for ANC.

The operational information includes but not limited to the rotational speed of the rotor 21 or the motor 22, the value of a current input to the motor 22, the load torque of the motor 22 or the value of the current actually flowing in the motor 22, or a control command.

For example, the noise generated by the generator 20 includes the noise generated by the rotation of the rotor 21, and the operational information is correlated with the rotational speed of the rotor 21. That is, since the noise includes the noise generated by the rotation of the rotor 21, the noise correlates with the operational information correlated with the rotational speed of the rotor 21. For example, the sound pressure level (the amplitude of frequency component of the sound) of the noise (wind noise) generated by the rotor 21 increases with increasing rotational speed of the rotor 21. In addition, the frequency increases with increasing rotational speed of the rotor 21. For this reason, by, for example, measuring the noise pattern of the noise generated by the rotor 21 for each of the rotational speeds of the rotor 21 in advance, the rotational speed of the rotor 21 and the noise pattern of the noise generated by the rotor 21 can be modeled in advance. That is, by acquiring the operational information including the rotational speed of the rotor 21, the processor 10 can acquire the reference signal (the noise pattern) in the same way as when the processor 10 picks up the actually generated noise.

In addition, for example, the value of a current input to the motor 22 and the rotational speed of the rotor 21 have a one-to-one correspondence if the load torque, such as the air resistance, is constant. However, since the load torque, such as the air resistance, is not constant due to, for example, a change in wind speed and a change in wind direction, the value of a current input to the motor 22 and the rotational speed of the rotor 21 do not have a one-to-one correspondence. In contrast, the rotational speed of the rotor 21 can be estimated from the value of a current input to the motor 22 and the load torque by using a widely known method. Alternatively, the rotational speed of the rotor 21 can be derived from the value of a current input to the motor 22 and the value of a current actually flowing in the motor 22 by using a widely known method. Consequently, by acquiring the value of the current input to the motor 22 and the operational information including the load torque of the motor 22 or the value of the current actually flowing in the motor 22, the processor 10 can obtain the reference signal (the noise pattern) in the same way as when the actually generated noise is picked up.

In addition, for example, the noise generated by the generator 20 includes noise generated by the rotation of the motor 22 rotating the rotor 21, and the operational information has a correlation with the rotational speed of the motor 22. That is, since the noise includes the noise generated by the rotation of the motor 22, the noise correlates with the operational information correlated with the rotational speed of the motor 22. For example, as the rotational speed of the motor 22 increases, the sound pressure level (the amplitude of the frequency component of sound) of the noise (the motor sound) generated by the motor 22 increases. In addition, as the rotational speed of the motor 22 increases, the frequency of the noise increases. For this reason, by measuring the noise pattern of the noise generated by the motor 22 for each of rotational speeds of the motor 22 in advance, the rotational speed of the motor 22 and the noise pattern of the noise generated by the motor 22 can be modeled in advance. That is, by acquiring the operational information including the rotational speed of the motor 22, the processor 10 can acquire the reference signal (the noise pattern) in the same way as when the actually generated noise is picked up.

Furthermore, for example, the unmanned aerial vehicle 1 is controlled (piloted) by a control command from a remote controller, such as a proportional system. The control command includes a command to control the rotation of the rotor 21 and the rotation of the motor 22 so that the unmanned aerial vehicle 1 goes up or down, right or left, forward or backward, or makes a turn. In addition, the control command includes the information about the path to be followed or the speed information. Consequently, a future variation of the rotational speed of the rotor 21 or the motor 22 can be predicted from the control command. As described above, the rotational speed of the rotor 21 or the motor 22 and the noise pattern of the noise generated by the generator 20 can be modeled in advance. Accordingly, by acquiring the operational information including a control command, the processor 10 can obtain a reference signal (the noise pattern) in the same way as when the actually generated noise is picked up.

The processor 10 (the opposite phase generation unit 12) generates an opposite phase signal with opposite phase relative to the signal corresponding to the operational information about each of the at least one generator 20 (step S12). According to widely used ANC, an opposite phase signal with opposite phase relative to a reference signal (the noise pattern) indicating the picked-up noise is generated to reduce the noise. In contrast, in this case, the generated signal is an opposite phase signal with opposite phase relative to the signal (the noise pattern) corresponding to the operational information correlated with the noise. Since the signal corresponding to the operational information (the noise pattern) is correlated with the noise generated by the at least one generator 20, the noise pattern can be considered as a noise pattern that is obtained when the noise is actually picked up. For example, a signal (a noise pattern) corresponding to the operational information is a noise pattern corresponding to at least one of noise (wind noise) generated by the rotation of the rotor 21 and noise (motor sound) generated by the rotation of the motor 22. Consequently, the opposite phase signal generated by the opposite phase generation unit 12 can be considered as a signal with a noise pattern formed by inverting the noise pattern indicating the actual noise. Note that the wind noise and the motor sound have different center frequency bands. Accordingly, even when the noise includes both the wind noise and the motor sound, an opposite phase signal can be generated for each of these frequency bands. The opposite phase generation unit 12 outputs the generated opposite phase signal to the at least one loudspeaker 50.

The processor 10 (the airframe control unit 13) controls the flight of the unmanned aerial vehicle 1 on the basis of a control command. For example, the airframe control unit 13 controls the motor control unit 14 such that the unmanned aerial vehicle 1 flies in accordance with the control command. Since the control command includes the path to be followed or the speed information, the airframe control unit 13 can predict, for example, the information in the next command on the basis of the control command. Thus, the airframe control unit 13 can predict the rotational speed of the rotor 21 or the motor 22 to be set.

The motor control unit 14 controls the at least one generator 20 that generates a force to fly the unmanned aerial vehicle 1. More specifically, on the basis of the command from the airframe control unit 13, the motor control unit 14 inputs, to the motor 22, such a current value that the rotational speed of the motor 22 matches that corresponding to the command.

For example, the acquisition device 30 acquires the rotational speed of the rotor 21. The acquisition device 30 is, for example, a laser measuring instrument. By using the laser measuring instrument that emits a laser beam to the rotor that is rotating and measures the reflected beam, the rotational speed of the rotor 21 can be obtained.

Note that the rotational speed of the rotor 21 can be obtained without using a laser measuring instrument. This is because as described above, the rotational speed of the rotor 21 can be estimated from the value of a current input to the motor 22 and the load torque of the motor 22 or the value of a current actually flowing to the motor 22. In this case, the acquisition device 30 acquires, for example, the value of a current input to the motor 22 that rotates the rotor 21 and the rotational information about the motor 22. The rotational information is, for example, the resistance to the rotation of the motor 22 (that is, the load torque) or the value of a current actually flowing in the motor 22. In this case, the acquisition device 30 is, for example, a measuring instrument having the function of an ammeter and the function of measuring the load torque. Furthermore, since the rotational speed of the rotor 21 and the rotational speed of the motor 22 have a correspondence relationship, the rotational speed of the motor 22 can be estimated from the value of a current input to the motor 22 and the load torque of the motor 22 or the current actually flowing to the motor 22, like the rotational speed of the rotor 21.

The control command acquisition device 40 is a wireless communication interface that acquires, from the remote controller, a control command for controlling the unmanned aerial vehicle 1. The control command acquisition device 40 includes, for example, an antenna and a radio signal transceiver circuit.

The at least one loudspeaker 50 outputs sound on the basis of the generated opposite phase signal (step S13). The at least one loudspeaker 50 is disposed in the vicinity of the generator 20, which is a source of noise. In this manner, the unmanned aerial vehicle 1 can reduce the noise generated by the generator 20 by using the sound output from the at least one loudspeaker 50 on the basis of the opposite phase signal.

Note that the at least one loudspeaker 50 may include only one loudspeaker 50. At this time, the processor 10 may generate one opposite phase signal with opposite phase relative to a signal corresponding to the operational information regarding each of the two or more generators 20, and one loudspeaker 50 may output sound on the basis of one opposite phase signal. That is, noise cancellation may be performed by combining the operational information of each of two or more generators 20 into one reference signal and using the single loudspeaker 50. In this manner, the noise generated by two or more generators 20 can be reduced by the single loudspeaker 50.

As described above, the unmanned aerial vehicle 1 includes the processor 10 and the at least one loudspeaker 50. The processor 10 acquires operational information regarding each of at least one generator 20 that generates a force to fly the unmanned aerial vehicle 1, where the operational information correlates with noise generated by the generator 20, and generates an opposite phase signal with opposite phase relative to a signal corresponding to the operational information. The at least one loudspeaker 50 outputs sound on the basis of the opposite phase signal.

According to the configuration, the actually generated noise is not used as the reference signal used for noise canceling. Instead, the operational information regarding the generator 20 (e.g., the rotor 21 and the motor 22 that rotate the rotor 21) is used, and the operational information correlates with the noise. Examples of the operational information include the rotational speed, the value of a current input to the motor 22, the load torque of the motor 22 or the value of the current actually flowing in the motor 22, and a control command. That is, since a microphone that picks up the actually generated noise is not used at the time of ANC, ANC is not influenced by wind noise generated by wind generated by the rotor 21 and hitting the microphone. As a result, ANC can be employed without being influenced by the wind from the rotor 21.

In addition, each of the at least one generator 20 may include a rotor 21. The noise generated by each of the at least one generator 20 may include the noise generated by the rotation of the rotor 21, and the operational information may have a correlation with the rotational speed of the rotor 21.

According to the configuration, the operational information correlated with the noise generated by each of the at least one generator 20 has a correlation with the rotational speed of the rotor 21. Consequently, the rotational speed of the rotor 21 and the noise pattern of the noise can be modeled in advance. Therefore, it is possible to generate, from the model, an opposite phase signal with opposite phase relative to a reference signal (the noise pattern) corresponding to the rotational speed of the rotor 21. Thereafter, the noise generated by the rotation of the rotor 21 can be reduced by the ANC using the rotational speed of the rotor 21 as the reference signal. In addition, the major noise generated by the unmanned aerial vehicle 1 can be effectively reduced without being influenced by the wind.

Furthermore, the unmanned aerial vehicle 1 may further include the acquisition device 30 that acquires the rotational speed of the rotor 21, and the operational information may include the rotational speed of the rotor 21.

According to the configuration, ANC according to the actual rotational speed of the rotor 21 can be performed by using the acquisition device 30 (for example, a laser measuring instrument) and acquiring the rotational speed of the rotor 21. Thus, more effective noise reduction can be performed. In addition, an opposite phase signal of a signal (a noise pattern) corresponding to the operational information including the rotational speed can be easily generated.

The unmanned aerial vehicle 1 may further include the acquisition device 30 that acquires the value of a current input to the motor 22 that rotates the rotor 21 and the rotational information about the motor 22. The operational information may include the current value and the rotational information.

For example, the rotational speed of the rotor 21 can be calculated by using the value of a current input to the motor 22 that rotates the rotor 21 and the rotational information about the motor 22 (for example, the load torque of the motor 22 or the value of the current actually flowing in the motor 22). Consequently, the rotational speed of the rotor 21 can be calculated by using the acquisition device 30 (for example, an ammeter or a load torque measuring instrument) and acquiring the value of a current input to the motor 22 and the rotational information about the motor 22. As a result, an opposite phase signal of a signal (a noise pattern) corresponding to the operational information including the value of a current input to the motor 22 and the rotational information about the motor 22 (that is, the operational information including the calculated rotational speed of the rotor 21) can be easily generated with a simple configuration, such as an ammeter, without using a laser measuring instrument or the like.

In addition, each of the at least one generator 20 may include a rotor 21. The noise generated by each of the at least one generator 20 may include noise generated by the rotation of a motor 22 that rotates the rotor 21. The unmanned aerial vehicle 1 may further include an acquisition device 30 that acquires the rotational speed of the motor 22, and the operational information may include information that is correlated with the rotational speed of the motor 22.

According to the configuration, the operational information including the information correlated with the noise generated by the each of the at least one generator 20 is correlated with the rotational speed of the motor 22. Consequently, the rotational speed of the motor 22 and the noise pattern of the noise can be modeled in advance. Therefore, it is possible to generate, from the model, an opposite phase signal of a reference signal (the noise pattern) corresponding to the rotational speed of the motor 22, and the noise generated in accordance with the rotational speed of the motor 22 can be reduced by the ANC using the rotational speed of the motor 22 as the reference signal. For example, by acquiring the rotational speed of the motor by using the acquisition device 30 (for example, a motor rotational speed measuring instrument including an ammeter or a load torque measuring instrument), the opposite phase signal of a signal (the noise pattern) corresponding to the rotational speed can be easily generated.

The unmanned aerial vehicle 1 may further include a control command acquisition device 40 that acquires a control command sent to the unmanned aerial vehicle 1, and the processor 10 may control the flight of the unmanned aerial vehicle 1 on the basis of the control command, calculate the rotational speed on the basis of the control command, and generate the opposite phase signal on the basis of the rotational speed.

For example, the unmanned aerial vehicle 1 is controlled (piloted) by a control command sent from a remote controller, such as a proportional system. The control command includes a command to control the rotation of the rotor 21 and the rotation of the motor 22 so that the unmanned aerial vehicle 1 goes up or down, right or left, forward or backward, or makes a turn. In addition, the control command includes information about the path to be followed or the speed information. Consequently, a future variation of the rotational speed of the rotor 21 or the motor 22 can be predicted from the control command. Consequently, for example, by acquiring a control command by using the control command acquisition device 40 (for example, a wireless communication interface), the rotational speed of the rotor 21 or the motor 22 can be calculated and, thus, the opposite phase signal of a signal (a noise pattern) corresponding to the rotational speed can be easily generated. In this manner, before the noise is generated, an opposite phase signal for reducing the noise can be generated in advance. As a result, the noise can be reduced without taking into account the processing delay.

In addition, the at least one generator 20 may include two or more generators 20. The at least one loudspeaker 50 may include only one loudspeaker 50. The processor 10 may generate one opposite phase signal with opposite phase relative to a signal corresponding to the operational information about the two or more generators 20, and the one loudspeaker 50 may output sound based on the one opposite phase signal.

According to the configuration, even when the unmanned aerial vehicle 1 includes two or more generators 20, one opposite phase signal is generated from the operational information about the two or more generators 20. Thus, the one loudspeaker 50 can reduce the noise generated by the two or more generators 20.

Other Exemplary Embodiments

While the unmanned aerial vehicle 1 of the present disclosure has been described above with reference to the exemplary embodiment, the present disclosure is not limited to the above-described exemplary embodiment. A variety of modifications of the present exemplary embodiment that are conceivable by those skilled in the art and an embodiment configured by combining constituent elements of different exemplary embodiments may be encompassed in the scope of the present disclosure, without departing from the spirit and scope of the present disclosure.

For example, according to the above-described exemplary embodiment, the processor 10 is integrated into the unmanned aerial vehicle 1. However, the functional constituent elements of the processor 10 may be provided separately from the unmanned aerial vehicle 1. For example, the processor 10 may be provided in a server apparatus (a computer) or the like separately disposed from the unmanned aerial vehicle 1. Furthermore, the functional constituent elements constituting the processor 10 may be distributedly disposed in a plurality of server apparatuses.

Furthermore, for example, according to the above-described exemplary embodiment, the unmanned aerial vehicle 1 includes the control command acquisition device 40. However, the unmanned aerial vehicle 1 does not necessarily have to include the control command acquisition device 40.

In addition, for example, the present disclosure is applied to the unmanned aerial vehicle 1 including at least one loudspeaker 50 to reduce noise. However, the present disclosure is not limited to the configuration. For example, the present disclosure may be applied to an unmanned aerial vehicle 1a that does not include any loudspeaker 50. The unmanned aerial vehicle 1a is described below with reference to FIG. 3.

Figure 3:
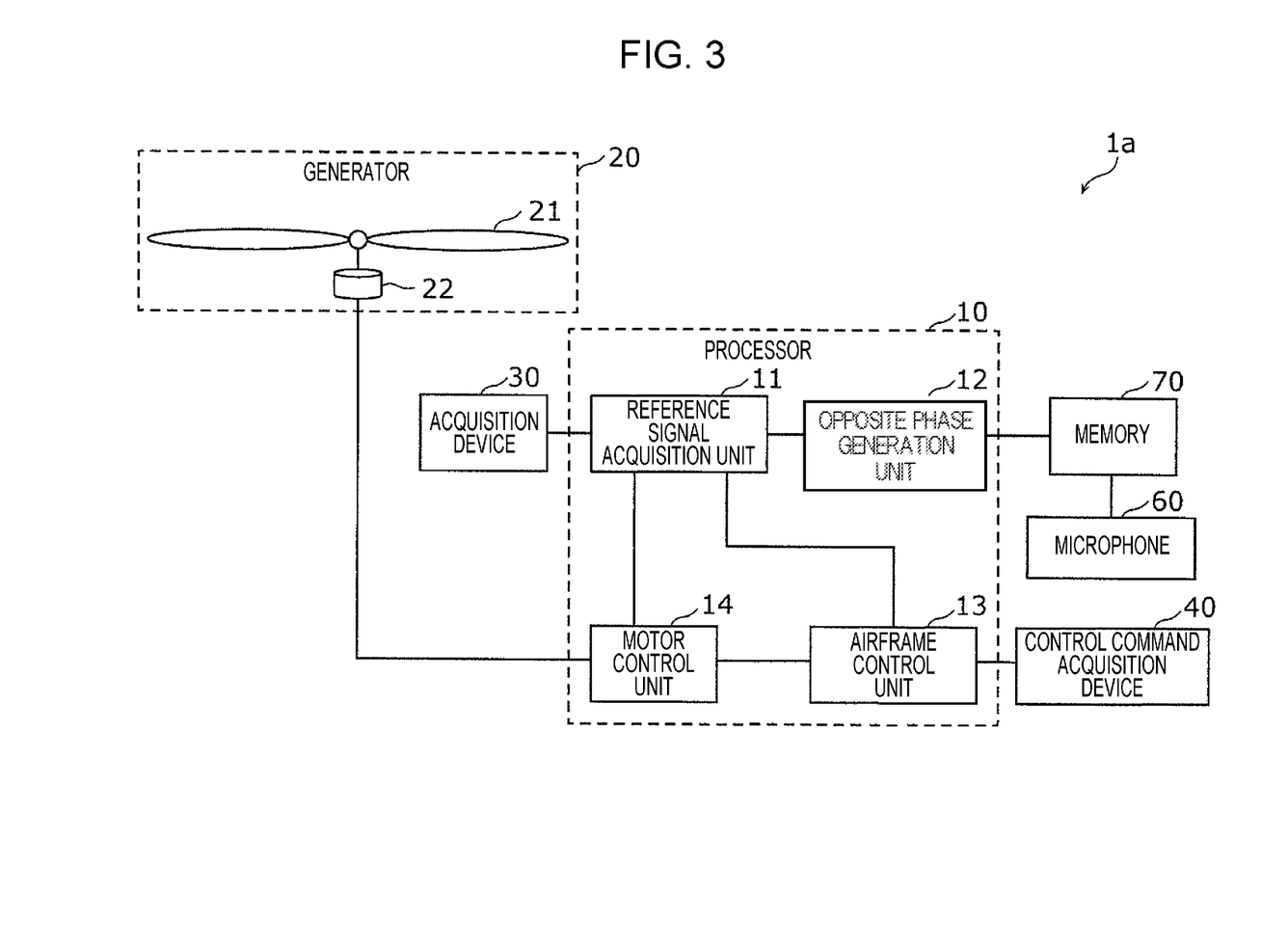
FIG. 3 is a schematic illustration of the configuration of an unmanned aerial vehicle according to another exemplary embodiment.

FIG. 3 is a schematic illustration of the configuration of the unmanned aerial vehicle 1a according to another exemplary embodiment. Unlike the above-described unmanned aerial vehicle 1, the unmanned aerial vehicle 1a does not include any loudspeaker 50. In addition, the unmanned aerial vehicle 1a includes at least one microphone 60 and a memory 70. Since the other configurations are the same as those of the unmanned aerial vehicle 1, description of the configurations is not repeated.

The microphone 60 picks up sounds around the unmanned aerial vehicle 1a to, for example, collect information. That is, the microphone 60 is not disposed near the generator 20 in order to apply ANC. According to the present disclosure, to apply ANC, the operational information about the generator 20 is used instead of a reference signal indicating the actual noise. Accordingly, a microphone for picking up actual noise is not needed. The sound picked up by the microphone 60 is stored (recorded) in the memory 70. Since the sound recorded in the memory 70 includes not only the sounds around the unmanned aerial vehicle 1a but also the noise generated by the unmanned aerial vehicle 1a (the generator 20), the noise needs to be reduced.

Therefore, the processor 10 (for example, the opposite phase generation unit 12) generates noise information corresponding to the noise generated by the generator 20 by using the operational information acquired by the acquisition device 30. Thereafter, the processor 10 performs a process to reduce the noise generated by the generator 20 from the sounds recorded in the memory 70 by using the noise information. As a result, the sound picked up as noise is reduced from the sound picked up as the sounds around the unmanned aerial vehicle 1a, and the sound that is produced around the airframe and that is to be picked up can be recorded clearly.

Furthermore, the present disclosure can be implemented as not only an unmanned aerial vehicle 1 but also an information processing method including a steps (processes) performed by each of the constituent elements of the unmanned aerial vehicle 1.

Alternatively, for example, these steps may be performed by a computer (a computer system). In this case, the present disclosure can be implemented as a program for causing a computer to execute the steps included in the method. Still alternatively, the present disclosure can be implemented as a non-transitory computer-readable storage medium (such as a CD-ROM) that records the program.

For example, when the present disclosure is implemented by a program (software), each of the steps is performed by executing a program using hardware resources, such as a central processing unit (CPU), a memory, and an input/output circuit of the computer. That is, each of the steps is executed by the CPU that acquires data from the memory or the input/output circuit or the like, performs calculation, and outputs the result of calculation to the memory or the input/output circuit.

Furthermore, each of the plurality of constituent elements included in the unmanned aerial vehicle 1 according to the above exemplary embodiment may be configured as a dedicated circuit or a general-purpose circuit. These constituent elements may be achieved as a single circuit or a plurality of circuits.

Furthermore, the plurality of constituent elements included in the unmanned aerial vehicle 1 according to the above exemplary embodiment may be implemented as an LSI (Large Scale Integration) which is an integrated circuit (IC). These constituent elements may be individually integrated into one chip, or some or all of the constituent elements may be integrated into one chip. The term "LSI" is also referred to as a "system LSI", a "super LSI" or an "ultra LSI", depending on the level of integration.

In addition, the integrated circuit is not limited to an LSI and may be achieved by a dedicated circuit or a general-purpose processor. A field programmable gate array (FPGA), which is programmable, may be used. Alternatively, a reconfigurable processor which allows reconfiguration of connections and settings of circuit cells in LSI may be used.

Moreover, should a circuit integration technology replacing LSI appear as a result of advancements in semiconductor technology or other technologies derived from the technology, the constituent elements included in the unmanned aerial vehicle 1 may be integrated by using the circuit integration technology.

Furthermore, an embodiment obtained by applying various modifications which those skilled in the art can conceive to the above-described exemplary embodiment and an embodiment obtained by combining the constituent elements and functions of the embodiments in any way within the spirit and scope of the present disclosure are also encompassed in the present disclosure.

For example, an aspect of the present disclosure can be used for an unmanned aerial vehicle to which ANC is applied.

What is claimed is:

1. An unmanned aerial vehicle, comprising:
   at least one generator that generates a force to fly the unmanned aerial vehicle, each of the at least one generator including a rotor and a motor that rotates the rotor;
   a sensor that acquires a first current input to the motor, and at least one of a load torque of the motor or a second current actually flowing in the motor;
   a processor that acquires operational information regarding each of the at least one generator and generates an opposite phase signal having an opposite phase relative to a signal corresponding to the operational information, the operational information correlating with wind noise generated by wind that is produced by rotation of the rotor of each of the at least one generator; and
   at least one speaker that outputs sound based on the opposite phase signal,
   wherein the processor acquires from the sensor, as the operational information, the first current input to the motor, and the at least one of the load torque of the motor or the second current actually flowing in the motor, and
   the processor generates the opposite phase signal based on the acquired first current and the acquired at least one of the load torque or the second current, to cancel the wind noise generated by wind that is produced by the rotation of the rotor.

2. The unmanned aerial vehicle according to claim 1, wherein the processor calculates a rotational speed of the rotor from the first current input to the motor, and the at least one of the load torque of the motor or the second current actually flowing in the motor.

3. The unmanned aerial vehicle according to claim 2, further comprising:
   an interface that acquires a control command sent to the unmanned aerial vehicle,
   wherein the processor controls flight of the unmanned aerial vehicle on a basis of the control command,
   wherein the processor calculates the rotational speed of the rotor on the basis of the control command, and
   wherein the processor generates the opposite phase signal on the basis of the control command.

4. The unmanned aerial vehicle according to claim 1, wherein the sensor includes at least one of an ammeter, or a load torque measuring instrument.

5. The unmanned aerial vehicle according to claim 1,
   wherein each of the at least one generator generates noise by rotation of the motor that rotates the rotor,
   wherein the processor acquires a rotational speed of the motor of each of the at least one generator, and
   wherein the operational information includes information that is correlated with the rotational speed of the motor of each of the at least one generator.

6. The unmanned aerial vehicle according to claim 1, wherein the at least one generator comprises two or more generators,
   wherein the at least one speaker comprises a single speaker,
   wherein the processor generates one opposite phase signal having an opposite phase relative to a signal corresponding to the operational information about the two or more generators, and
   wherein the single speaker outputs the sound based on the one opposite phase signal.

7. A computer system for an unmanned aerial vehicle including at least one generator that generates a force to fly the unmanned aerial vehicle, each of the at least one generator including a rotor and a motor that rotates the rotor, the computer system comprising:
   a processor;
   a sensor that acquires a first current input to the motor, and at least one of a load torque of the motor or a second current actually flowing in the motor;
   at least one speaker; and
   a memory including a program that, when executed by the processor, causes the processor to perform operations including:
      acquiring operational information regarding each of the at least one generator of the unmanned aerial vehicle;
      generating an opposite phase signal having an opposite phase relative to a signal corresponding to the operational information, the operational information correlating with wind noise generated by wind that is produced by rotation of the rotor of each of the at least one generator; and
      causing the at least one speaker to output sound based on the opposite phase signal,
   wherein the acquiring acquires from the sensor, as the operational information, the first current input to the motor, and the at least one of the load torque of the motor or the second current actually flowing in the motor, and
   the generating generates the opposite phase signal based on the acquired first current and the acquired at least one of the load torque or the second current, to cancel the wind noise generated by wind that is produced by the rotation of the rotor.

8. The unmanned aerial vehicle according to claim 1, wherein the sensor includes an ammeter that acquires the first current input to the motor, and a load torque measuring instrument that acquires the load torque of the motor.

* * * * *